June 2, 1959 — F. C. KOCH — 2,889,003
COOLING TOWER
Filed Nov. 1, 1955

INVENTOR.
Fred C. Koch.
BY Thiess, Olsen, Mecklenburger, van Holst, & Coltman. Attys.

United States Patent Office 2,889,003
Patented June 2, 1959

2,889,003

COOLING TOWER

Fred C. Koch, Wichita, Kans., assignor to Koch Engineering Company, Inc., Wichita, Kans., a corporation of Kansas Application November 1, 1955, Serial No. 544,283

3 Claims. (Cl. 183—13)

This invention relates to an improved cooling tower.

Cooling towers are employed in those operations in which it is more economical to cool the water and reuse it rather than discharge it as waste and, also, in those areas where water is scarce. The cooling tower hereinafter disclosed is particularly useful where relatively small volumes of water are to be cooled, for instance in a home air-conditioning unit, although the specific inventive concepts revealed are not intended to be confined to such installations solely.

It is an object of this invention to provide a cooling tower which may efficiently operate without utilizing any auxiliary fan means but which uses only the descending water spray as the draft-creating means.

It is a further object of this invention to provide a cooling tower which may efficiently operate without the use of packing or contacting material in the tower chamber.

It is a still further object of this invention to provide a cooling tower which is efficiently operable despite a simplicity of design heretofore unknown to the art.

It is another object of this invention to provide a flexible cooling tower imparting varying degrees of cooling capacity to the water passing therethrough.

It is still another object of this invention to provide a cooling tower which may utilize fan means to increase air circulation through the tower when such increase is desirable.

The above and other objects of this invention will become more apparent from the following description, accompanying drawing and appended claims.

In one embodiment of the cooling tower construction disclosed, a tower or enclosure is provided having an open upper end limit in direct contact with the atmosphere. A plurality of sprays in communication with the warm liquid which is to be sprayed and cooled is disposed across a tower cross-sectional area adjacent the open end. Upon emerging from the sprays, the descending water creates a downward draft pulling in air through the tower open end which functions to rapidly cool the warm liquid by evaporation. A tower water-deentraining section is peripherally disposed about the tower adjacent the lower end limit thereof which enables the air to flow out from the tower interior while the water entrained in the air is filtered out at the deentraining section and flows into an underlying basin. The cooled water is collected in the basin for recycling to the point of use whereat its new heat-absorbing capacity is utilized.

Figure 1:
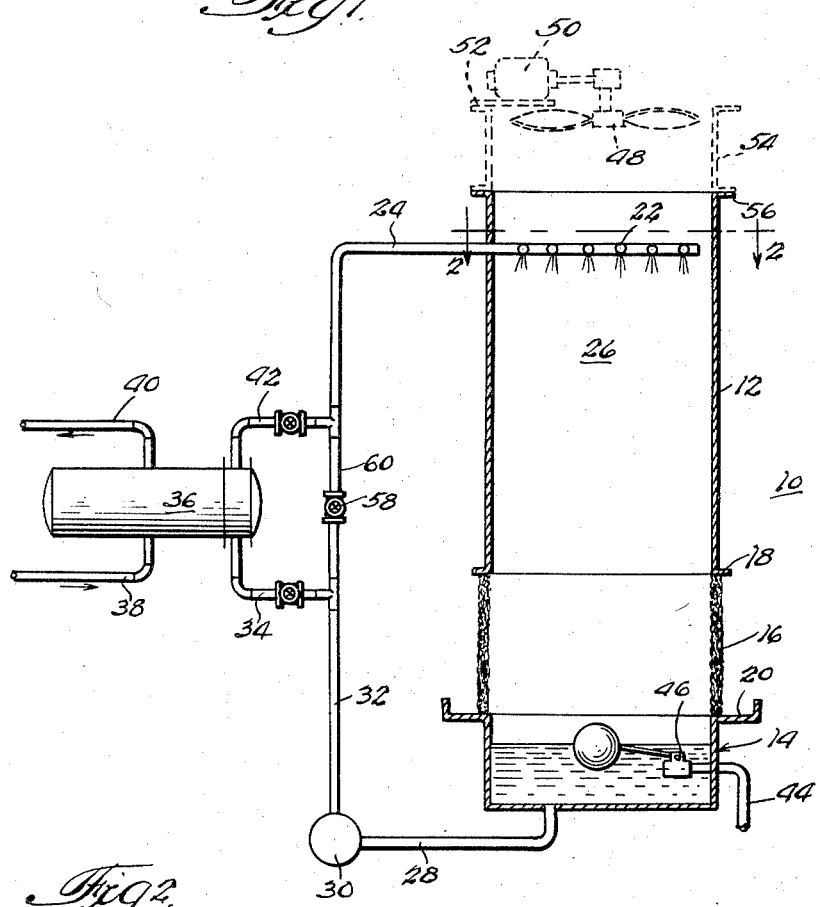
Figure 2:
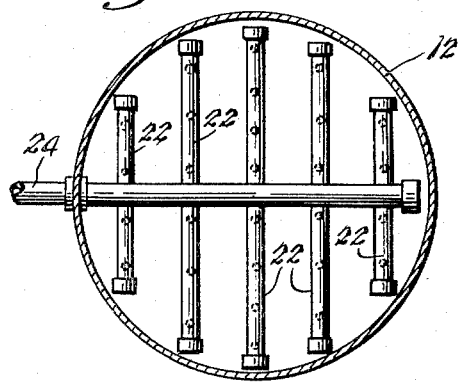

For a more complete understanding of this invention, reference should now be had to the drawings, wherein Fig. 1 is a sectional view of a cooling tower constructed in accordance to the principles of this invention utilized in conjunction with a heat exchanger; and Fig. 2 is a sectional view taken on line 2—2 of Fig. 1.

Referring now, more particularly, to Fig. 1, a cooling tower 10 is illustrated comprising an upper shell or enclosure portion 12 which is disposed above a bottom reservoir or basin portion 14. Intermediate these latter two tower portions is a peripheral water-deentraining section 16 which tightly abuts against a lower flange 18 defining the lower end limit of the tower shell portion 12 and the annular troughlike portion 20 which defines the upper end limit of the basin portion 14 of the provided tower. The water-deentraining section 16 is readily air permeable but prevents the escape of fine water particles to the exterior of the tower for reasons which will hereinafter be made more apparent. Reenforcing rods (not shown) may be utilized in maintaining tower sections 12 and 14 in spaced-apart relationship.

Inserted across the tower cross-sectional area adjacent the upper open end limit thereof is a plurality of spray members 22, more clearly shown in Fig. 2. As has previously been mentioned, it is the purpose of a cooling tower to cool warm liquids by contacting the same with air having a wet bulb temperature which is lower than the temperature of the liquid. If the temperature conditions are as above stated, the water or other liquid is rapidly cooled by evaporation. Also, if the unsaturated air is cooler than the water with which it is brought into contact, the water is also cooled by the transfer of sensible heat to the air.

The warm water which enters the sprays 22 through conduit 24 is broken up into fine particles and immediately cooled by evaporation effected by air being drawn into a tower chamber 26 by means of the draft created by the descending water spray particles. It is to be noted that the descending water particles emerging from the sprays 22 create a draft which adequately cools the warm water entering through conduit 24 without the use of an auxiliary power-driven fan means. The benefit of tower operation without utilizing a power-driven fan is obvious in that installation expense and power consumption are eliminated, in addition to the expense of the fan itself.

The tower chamber 26 is completely empty between the sprays 22 and the tower basin portion 14. This is a very desirable feature since there is no obstruction to the flow of air being drawn downwardly through the shell upper end limit and thence out the peripheral water-deentraining section 16. It is apparent from the illustrated tower that the bulk of the water, over 90 percent, will drop directly into the basin 14. Some water, however, may be entrained in the air in the course of flowing outwardly to the exterior of the tower through the deentraining peripheral section 16. The latter section is preferably composed of a fibrous material, such as glass wool, which will filter out fine water particles whereupon the latter particles will drain and descend into the basin. The trough 20 is provided for collection and recovery of any moisture condensation which may form on the exterior surface of section 16 and for recovery of the filtered spray which may trickle down on the section exterior surface.

In the normal course of tower operation, water is sprayed downwardly through the open tower chamber 26 and, in the course of so doing, cools and draws air through the open end of the tower shell 12. The air escapes from the tower through the peripheral deentraining section 16 and the cooled water is collected in basin 14. The water in the basin is recycled from the tower by means of a conduit 28 which connects the stored cool water to a pump 30. The latter pump passes the water by means of conduit 32 and valved conduit 34 to a heat exchanger 36 wherein the cooled water engages in heat exchange relationship with a warm refrigerant or other warm fluids which enter the heat exchanger by means of a conduit 38 and exit therefrom by means of a conduit 40. Having passed through the heat exchanger, the now warm water exits therefrom by means of a valved conduit 42, passes through the tower-entering conduit 24, whereupon it is once again sprayed downwardly into the cooling tower chamber 26.

To make up for any water losses which may occur in the course of the cooling operation, a water inlet conduit 44 is in communication with the basin. The end limit of the conduit 44 disposed in the basin 14 has a float-operated valve member 46 affixed thereto which assures a minimum level in the basin 14 at all times.

Although, as has been above explained, the illustrated tower will efficiently operate without the use of a power-driven fan means, the provided tower may be used in combination with such a fan, such as fan 48, illustrated in dotted lines in Fig. 1. The fan is driven by means of motor 50 which is supported on a platform 52 which is, in turn, supported by means of an upper annular tower section 54. The latter section is suitably affixed to the flange portion 56 defining the upper end limit of the tower section 12. By disposing the fan 48 above the sprays, only dry air is handled, thereby eliminating all rust and corrosion problems because of the fluid being handled. It is the obvious purpose of fan 48 to force air from the atmosphere downwardly past sprays 22 and out through the peripheral tower section 16.

An alternate method of increasing air circulation through the illustrated tower construction without utilizing a fan member comprises increasing the water circulation through the tower but not increasing the circulation through the refrigerant cooler or heat exchanger 36. This latter increase of water circulation may be effected by opening bypass valve 58 which is interposed in conduit section 60 which, in turn, affords direct communication between the cooled water in conduit 32 and that water in conduit 24 entering the sprays 22. By increasing the activity of the pump 30, water will flow both through the heat exchanger 36 and also through conduit 60; consequently, increased cooling of the water will be effected without the use of a fan member.

It is thus seen that a cooling tower has been provided which is extremely simple in design. As has been above mentioned, the usual packing or contacting material present in the interior of such a tower construction has been eliminated. Such elimination allows the provided tower to efficiently operate because of the very low pressure drop in the tower chamber 26 in the course of the air flow from the tower opening, through the tower chamber 26, and then out the peripheral section 16. The provided tower construction presented is extremely flexible, as above noted, and may be used in conjunction with the power-driven fan, if so desired; and, in addition, means are provided for increasing the water circulation or cooling without utilizing a power-driven fan means.

Certain modifications of the specific embodiment shown may be made without departing from the spirit and scope of this invention. For example, louvers composed of wood or other material may be substituted for the glass wool peripheral section 16, and the provided tower will function to advantage. The tower may be of rounded or rectilinear configuration and may obviously have its capacity increased by utilizing multiples of sprays and fans.

While one particular embodiment of this invention is shown above, it will be understood, of course, that the invention is not to be limited thereto, since many modifications may be made, and it is contemplated, therefore, by the appended claims, to cover any such modifications as fall within the true spirit and scope of this invention.

I claim:

1. In a combination for cooling liquids, a hollow enclosure having an upper end section the distal end of which is in communication with the surrounding atmosphere, a liquid de-entraining, air-permeable section defining a lower peripheral wall portion of said enclosure and comprising a uniform continuation of said upper end section, spray means disposed in said upper end section for spraying liquids in the direction of said air-permeable section, said liquids being broken into fine particles which are discharged with such force as to entrain air in the normal spraying operation, said spray means action inducing air to enter said enclosure distal end, flow downwardly into said enclosure and out said air-permeable section, the distance between said spray means and said air-permeable section being sufficient to enable said liquid particles to partially evaporate because of contact with said air induced to enter said enclosure whereby the temperature thereof is lowered.

2. The combination as recited in claim 1 in which said de-entraining section is composed of glass fibers.

3. The combination as recited in claim 1 in combination with a basin section defining the bottom end limit of said enclosure, said basin having regulatable liquid outlet means and a pump means interposed in said outlet means whereby the collected liquid may be withdrawn from said basin to the exterior of said tower, said pump means also being in direct, regulatable, fluid communication with said spray means whereby at least a portion of the liquid in said basin may be directly returned to said spray means from said basin section.

References Cited in the file of this patent

UNITED STATES PATENTS

| | | |
|---|---|---|
| 1,331,404 | Veil | Feb. 17, 1920 |
| 1,986,653 | Wade | Jan. 1, 1935 |
| 2,022,740 | Rowell | Dec. 3, 1935 |
| 2,062,158 | Berlowitz | Nov. 24, 1936 |
| 2,088,962 | Klencker | Aug. 3, 1937 |
| 2,221,010 | Van Vliet | Nov. 12, 1940 |
| 2,337,983 | Fisher | Dec. 28, 1943 |
| 2,553,121 | Touton | May 15, 1951 |
| 2,631,830 | Carraway | Mar. 17, 1953 |

FOREIGN PATENTS

| | | |
|---|---|---|
| 718,487 | Great Britain | Nov. 17, 1954 |